United States Patent Office 3,117,167
Patented Jan. 7, 1964

3,117,167
STABILIZATION OF ENE-YNE COMPOUNDS
Robert J. Burch, Scotch Plains, N.J., and Calvin E. Schildknecht, Gettysburg, Pa., assignors to Air Reduction Company, Incorporated, New York, N.Y., a corporation of New York
No Drawing. Filed Mar. 16, 1960, Ser. No. 15,385
3 Claims. (Cl. 260—666.5)

This invention relates to the stabilization of polymerizable compounds and is more particularly concerned with the stabilization of ene-yne compounds, i.e. compounds having a triple bond and at least one double bond. More specifically, the invention is concerned with the stabilization of ene-yne compounds which undergo polymerization by free-radical mechanisms, i.e. polymerization which is accelerated by heating, peroxides, and irradiation. The invention is most particularly concerned with the stabilization of ene-yne compounds of the character indicated which have the following general formula

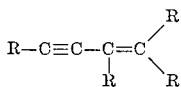

(A)

wherein R is hydrogen, an alkyl radical containing 1 to 8 carbon atoms, an alkenyl radical of 1 to 8 carbon atoms and containing at least one double bond, phenyl radicals, phenyl radicals substituted by alkyl groups of 1 to 6 carbon atoms, and alkyl and phenyl radicals substituted by negative or electron-attracting groups, e.g. halogen groups and oxygen-, nitrogen-, or sulfur-containing groups, such as —Cl, —CN, —COOH, COOR', —OH, —NO$_2$, —NH$_2$ and —SH, wherein R' is an alkyl group containing 1 to 6 carbon atoms.

Typical examples of compounds of Formula A are isopropenyl acetylene (2-methyl-1-butene-3-yne), vinyl acetylene (1-butene-3-yne), 2-methyl-2-nonene-4-yne, 3-methyl-2-pentene-4-yne, 3-heptene-7-ol-1-yne, 6-methyl-5-decene-10-ol-7-yne, 1-phenyl-1-octene-3-yne, 1-phenyl-2-hexene-4-yne, 1-tolyl-2-hexene-4-yne, 3-hexene-5-yne-2-ol, 2-ethylamino-3-hexene-5-yne, 3-chloro-2-pentene-4-yne, 3-hexene-5-yne-2-nitro, 3-carboxy-2-pentene-4-yne, 3-hexene-2-cyano-5-yne, 3-methylcarboxy-2-pentene-4-yne, diisopropenyl acetylene (2,5-dimethyl-1,5-hexadiene-3-yne), divinyl acetylene (1,5-hexadiene-3-yne), and 1,5,7-octatriene-3-yne.

Ene-yne compounds of the type specified are well known compounds readily prepared by known procedures such as described at pages 105 to 127 of "Acetylenic Compounds in Organic Synthesis" by R. A. Raphael, published in 1955 by Butterworths Scientific Publications, London, England. These compounds are readily polymerizable and difficulty is often experienced in maintaining them in monomeric form prior to use. Isopropenyl acetylene and diisopropenyl acetylene, for example, polymerize at 75° C. to a substantially complete gelled state in nine to eleven days. There is thus an important problem present when it is desired to prevent or to retard polymerization of such ene-yne compounds for purposes of storage or for carrying out processes, such as distillation, at temperatures at which polymerization normally occurs. Ene-yne compounds of the character indicated not only are used to form polymeric products but they are high-energy hydrocarbon compounds, e.g. they are compounds which liberate substantial heat upon decomposition, and they, therefore, find considerable use as monopropellant fuels. Upon storage in high-temperature climates, however, the polymerization which these compounds undergo releases energy and produces polymeric products which are lower energy liquids or solids. Hence, the fuel value of the original monomers is materially reduced.

It is accordingly an object of the present invention to provide a process for the stabilization of ene-yne compounds against undesired polymerization.

It is a further object of the invention to provide compositions comprising ene-yne compounds in stabilized form.

In accordance with the present invention, ene-yne compounds are effectively stabilized against polymerization by adding to them small amounts of Lewis acids or their addition complexes, more particularly halogen-containing Lewis acids or their addition complexes. When these additives are incorporated with the ene-yne compounds, polymerization during storage is retarded to a material extent. The ene-yne compounds of Formula A appear to be surprisingly unique among unsaturated compounds in their response to polymerization-inhibiting additives. Thus, additives such as quinone and thymol, which are normally effective polymerization inhibitors, particularly for monomers which undergo free-radical polymerization, accelerate polymerization of ene-yne compounds such as an isopropenyl acetylene and diisopropenyl acetylene. On the other hand, the Lewis acids and their addition complexes are normally considered polymerization accelerators or promoters and they are active as catalysts for the polymerization of monomers which undergo cationic polymerization. Furthermore, it is a feature of the present invention that stabilization of ene-yne compounds against polymerization can be effected even with relatively small amounts of the specified additives.

Other objects and features of the invention will be readily apparent from the following detailed description and from the illustrative embodiments of the invention set forth below.

Lewis acids are a well-known class of compounds characterized by the late Gilbert N. Lewis as electron acceptors. Typical examples of Lewis acids useful in accordance with the present invention are boron trifluoride, alumium chloride, aluminum bromide, stannous chloride, zinc chloride, titanium tetrachloride, zirconium tetrafluoride, and like inorganic halides, and halo-organic acids such as trichloroacetic acid, trifluoroacetic acid, and the like. The complexes of these Lewis acids which are also effective polymerization stabilizers for ene-yne compounds are exemplified by the coordination compounds with phenol, lower alkyl (1 to 6 carbon atoms) alcohols such as methanol, ethanol, and butanol, lower alkyl ethers such as diethyl ether, methylethyl ether, dibutyl ether, and propylbutyl ether, cyclic saturated ethers containing up to six carbon atoms such as tetrahydrofuran, and the like. Particularly suitable are the complexes of boron trifluoride, such as boron trifluoride-phenol, boron trifluoride-diethyl ether, and boron trifluoride-tetrahydrofuran, and the halo-lower alkyl aliphatic acids such as trichloroacetic acid and trifluoroacetic acid.

The quantity of the additive incorporated in the ene-yne compound may vary from 0.05% by weight upwardly. As little as 0.05% by weight is effective to bring about substantial retardation of polymerization of the ene-yne compounds for substantial periods of time, but it has been found that increased inhibition can be achieved with increased quantities. Generally speaking, it is preferred to use at least 0.25% by weight and up to about 1% by weight. However, greater amounts may be used, but up to about 5% by weight is usually sufficient.

The additive is suitably incorporated in the ene-yne compound by simple addition, preferably followed by mechanical mixing to insure uniform distribution in view of the small proportion generally involved. No special pressure or temperature conditions are required and mixing is readily effected at normal atmospheric pressure and at normal room temperature.

The complexes, or coordination compounds as they are sometimes called, of the Lewis acids are really prepared by mixing the Lewis acid and the coordinating agent, with the coordinating agent generally being used in substantially stoichiometric quantity. For example, to prepare boron trifluoride-tetrahydrofuran, boron trifluoride is passed through tetrahydrofuran until fuming occurs which indicates that the boron trifluoride has reacted completely with the ether in a 1:1 complex. The complex is then added dropwise with stirring directly into the monomeric material to be stabilized. Alternatively, the complex may be added first to an oxygen-containing organic solvent before addition to the monomer since it has been found that the oxygen containing organic solvent is advantageously used with the Lewis acid complexes in order to decrease the acidity of the complexes, particularly the complexes with cyclic oxygen compounds such as tetrahydrofuran, and to insure better miscibility with the monomer. Thus, the complex is suitably combined with two to three parts by volume per part of complex isopropenyl acetylene, less than 0.005% water, and less than 0.005% carbonyl, plus undetermined impurity traces.

All glassware and vials used for the storage stability tests were carefully cleaned with toluene, acetone, laboratory cleaning solution, and distilled water. All storage bottles had caps with tin foil liners. The glass vials used for the tests were 16 cm. in length and had an outside diameter of 1.9 cm., with a wall thickness of 2 mm. Four ml. of the blank test samples of IPA and DIPA and of the test samples containing the various additives were added to the test vials and the vials were stoppered with a cork stopper covered with tin foil. The bottoms of the vials were placed in liquid nitrogen and the vials were sealed at a constriction just below the stopper by means of a hand torch. The vials were then stored at 75° C. in constant temperature baths. Periodic observations were noted on increase in viscosity and polymer formation, and percent conversion to polymer was noted after predetermined periods of time. Some of the vials were stored until gelation occurred. Gelation was indicated by a sudden increase in viscosity. The pertinent data are shown in Table I wherein each example corresponds to a test sample.

*Table I*

| Example | Ene-yne Compound | Additive | Conc. of Additive, wt. percent | Hours Stored | Percent Conversion to polymer | Time to Gel, Days |
|---|---|---|---|---|---|---|
| 1 | IPA | none | | 226 | | 9 |
| 2 | IPA | quinone | 0.25 | 120 | | 5 |
| 3 | IPA | thymol | 0.25 | 120 | | 5 |
| 4 | IPA | BF₃-tetrahydrofuran | 0.25 | 960 | | >40 |
| 5 | DIPA | none | | 264 | | 11 |
| 6 | DIPA | BF₃-tetrahydrofuran | 0.25 | 960 | | >40 |
| 7 | IPA | none | | 112 | 21 | |
| 8 | IPA | BF₃-tetrahydrofuran | 1.0 | 96 | 7 | |
| 9 | IPA | I₂ | 1.0 | 112 | 18 | |
| 10 | IPA | P₂O₅ | 1.0 | 112 | 13 | |
| 11 | IPA | Phenyl hydrazine-HCl | 1.0 | 112 | 11 | |
| 12 | IPA | H₂SO₄ | 1.0 | 112 | 9 | |
| 13 | IPA | ZnCl₂ | 1.0 | 96 | 13 | |
| 14 | IPA | None | | 96 | 17 | |
| 15 | IPA | AlCl₃ | 1.0 | 96 | 12 | |
| 16 | IPA | SnCl₂ | 1.0 | 96 | 8 | |
| 17 | IPA | Trichloro-acetic acid | 1.0 | 96 | 7 | |
| 18 | IPA | Trifluoro-acetic acid | 1.0 | 96 | 6 | | of the oxygen-containing organic solvent which may be, for example, a lower alkyl aliphatic alcohol such as methanol, or a lower alkyl aliphatic ether, such as diethyl ether. Advantageously, the stabilized monomers are stored in the absence of molecular oxygen or they have added to them a small amount, e.g. 0.25–1% by weight, of an antioxidant such as a phenol, e.g. tertiary butylphenol, or an arylamine such as methyl aniline.

The following specific examples will serve to provide a fuller understanding of the present invention. These examples show the comparative results which are obtained when ene-yne compounds are tested for storage stability without the use of any additive and when the same compounds are tested for storage stability after having admixed with them small amounts of representative Lewis acids or their addition complexes. At the same time, there are also set forth the results obtained when the ene-yne compounds are admixed with additives of a type normally having polymerization-inhibiting activity upon other unsaturated compounds.

In the examples, isopropenyl acetylene (IPA) and di-isopropenyl acetylene (DIPA) have been used as representative of the Formula A additives. The IPA used in preparing the test samples analyzed 99.8–99.9% isopropenyl acetylene, less than 0.01% water, and less than 0.02% carbonyl calculated as acetone, the balance being undetermined impurity traces. The DIPA used in preparing the test samples showed by analysis 99.7+% di- When the ene-yne compounds are to be used for purposes other than the formation of polymers, e.g. as fuels, they may be used directly without removing the polymerization inhibitor. When, however, it is desired to form polymers from them, then it is necessary to free them from the inhibitor. This is readily effected by fractional distillation under vacuum.

It will be understood that various changes and modifications may be made in the invention as above described without departing from its scope as defined in the appended claims and it is intended, therefore, that all matter contained in the foregoing description shall be interpreted as illustrative only and not as limitative of the invention.

What we claim and desire to secure by Letters Patent is:

1. A composition stabilized against polymerization comprising a compound having the formula

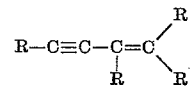

where R is selected from the group consisting of hydrogen, alkyl radicals containing from 1 to 8 carbon atoms, and an alkenyl radical containing from 2 to 8 carbon atoms, and a small amount not less than 0.05 percent to 5 percent by weight of a Lewis acid additive selected from the group consisting of boron trifluoride and the phenol, diethyl ether and tetrahydrofuran complexes thereof, phosphorus pentoxide, phenylhydrazine hydrochloride, sulfuric acid, zinc chloride, aluminum chloride, stannous chloride, trichloroacetic acid, and trifluoracetic acid.

2. A composition stabilized against polymerization comprising isopropynol acetylene and 0.05 percent to 5 percent by weight of an additive selected from the group consisting of boron trifluoride and the phenol, diethyl ether and tetrahydrofuran complexes thereof, phosphorus pentoxide, phenylhydrazine hydrochloride, sulfuric acid, zinc chloride, aluminum chloride, stannous chloride, trichloroacetic acid, and triufluoroacetic acid.

3. A composition stabilized against polymerization comprising diisopropynol acetylene and 0.05 to 5 percent by weight of an additive selected from the group consisting of boron trifluoride and the phenol, diethyl ether and tetrahydrofuran complexes thereof, phosphorus pentoxide, phenylhydrazine hydrochloride, sulfuric acid, zinc chloride, aluminum chloride, stannous chloride, trichloroacetic acid, and trifluoroacetic acid.

References Cited in the file of this patent

UNITED STATES PATENTS

| | | |
|---|---|---|
| 1,924,979 | Colcott et al. | Aug. 29, 1933 |
| 2,669,507 | Young | Feb. 16, 1954 |
| 2,934,577 | Graham | Apr. 26, 1960 |
| 2,947,795 | Keown | Aug. 2, 1960 |
| 2,990,434 | Smith | June 27, 1961 |

OTHER REFERENCES

Collected Papers of Wallace Hume Carothers on High Polymeric Substances, "High Polymer Series," vol. 1, 1940, Interscience Pub. Inc., New York, part 2, pp. 277–281.

Nievwland et al.: The Chemistry of Acetylene, 1945, Reinhold Pub. Co., New York, chapter V, pp. 164–171, pp. 164–166 specifically applied.

Noller: "Chemistry of Organic Compounds," copyright 1951, page 235, W. B. Saunders Co., Philadelphia and London.